United States Patent [19]
Caroli

[11] 3,744,948
[45] July 10, 1973

[54] STICK INJECTOR WITH VACUUM PICKUP

[75] Inventor: Italo Caroli, Westmount, Quebec, Canada

[73] Assignee: DBM Industries Limited, Montreal, Quebec, Canada

[22] Filed: June 15, 1971

[21] Appl. No.: 153,189

[52] U.S. Cl. .................. 425/125, 425/DIG. 219
[51] Int. Cl. ................................................ A23g 5/02
[58] Field of Search ................... 425/126, 123, 125;
249/92; 214/1 BC, 1 Q; 294/87 SH; 198/131,
179, 25, 209, 210; 62/340, 345, 356

[56] References Cited
UNITED STATES PATENTS

| | | | |
|---|---|---|---|
| 3,035,686 | 5/1962 | Hoyer | 198/209 |
| 2,700,347 | 1/1955 | Gram et al. | 425/126 |
| 2,705,857 | 4/1955 | Fox et al. | 425/126 X |
| 3,232,410 | 2/1966 | Teago | 214/1 BV X |
| 3,300,063 | 1/1967 | Jensen et al. | 198/179 X |
| 3,370,881 | 2/1968 | Renfroe | 294/104 X |

*Primary Examiner*—J. Spencer Overholser
*Assistant Examiner*—David S. Safran
*Attorney*—Cushman, Darby & Cushman

[57] ABSTRACT

An apparatus and system are described for inserting sticks into liquid confection material contained in a mold being carried along, preferably through a bath of refrigerant. A transfer spider assembly having a number of laterally-extending arms is mounted beside the refrigerant bath. At least one stick-gripping mechanism is supported by each of the arms of the spider assembly. Preferably, these mechanisms are grouped in clusters which enable the same to receive and grip sticks being provided in a selected configuration from a supply hopper. Each stick-gripping mechanism includes elements biased into contact with one another for releasably gripping a stick therebetween. A stick transfer conveyor is supported in operative relationship to the bath of refrigerant and the molds therein. This conveyor has a plurality of stick-supporting flights for accepting sticks from the transfer spider assembly and supporting them. The transfer conveyor is adapted to be driven in synchronism with the movement of said molds and is positioned to enable said stick-supporting flights to insert sticks into the liquid confection material in the molds, support the sticks therein and to automatically enable release of the same after a predetermined amount of travel and solidification of the confection material. Preferably, sticks are supplied by a vacuum-operated supply means having a pair of vacuum pick-up heads supported at approximately 90° to one another by a pivotally movable yoke assembly. Each vacuum pick-up head is adapted to be connected to a vacuum source, is provided with a series of passageways, and slideably supports a perforated plate. This plate is perforated and shaped so as to enable picking up sticks in the desired configuration, one stick for each mold containing ice cream and two sticks for each mold containing a popsicle confection.

9 Claims, 6 Drawing Figures 3,744,948

STICK INJECTOR WITH VACUUM PICKUP

This invention relates to a system and apparatus for inserting sticks into confections such as popsicles, ice-cream bars and the like. More particularly, the present invention deals with a system and apparatus for inserting sticks into a liquid confection material contained in a mold being moved along, preferably through a bath of refrigerant. Inserting the sticks into the confection material while is it still liquid and supporting those sticks while the material solidifies, enables significant advantages to be gained.

BACKGROUND OF THE INVENTION

It has long been an established practice in this art to inject sticks into semi-hardened confection material contained in a mold by means of the application of a controlled amount of pressure. The apparatus which provides this stick injecting pressure has usually been supported over the bath of refrigerant through which the molds containing the confection material are passed. As the molds are conveyed through that refrigerant, the confection material slowly hardens. Certain difficulties have occurred in the past due to the significantly different hardening characteristics of a confection such as ice cream which is a milk emulsion, and the solution used to make popsicles. Such a solution is almost entirely water. As may be seen by referring to a phase diagram for water, the transition from solid to liquid and vice versa is well defined and sharp. In other words, the popsicle confection solution or mixture which is largely water cools off as it is conveyed through the bath refrigerant. At some rather well defined zone or region, say at about the 20th row of molds, that mixture has cooled sufficiently to freeze. Hence, the zone is narrow within which the confection mixture changes from a thickened solution having some consistency, to a rather fully solidified, ice-like material. In order for the injection operation of sticks into such a semi-hardened popsicle mixture to be successful, operating personnel have in the past been stationed adjacent the bath of refrigerant and have moved the injection apparatus if it was apparent that the mixture was either too hard or inadequately solidified to support a stick in the same. It is to be emphasized that if the confection material had not hardened sufficiently, the stick would simply float or fall over in the same with the result that it was improperly aligned in the mold. Often, this misalignment could result in faulty operation of the subsequent equipment which coated and/or packaged that frozen confection. On the other hand, if the material had hardened too greatly, a very large amount of pressure was required to penetrate the frozen material. Frequently, this caused physical damage and breakage of the sticks involved, in which case the article being produced had to be rejected. Considerable care, therefore, had to be exercised in successfully producing an acceptable product.

In addition, because the sticks were being injected under pressure into a semi-hardened material, they had to be of a high quality as regards uniform strength, lack of flaws in the stick, adequate smoothness, and the like. It is well known that because of those rather stringent requirements, the reject rate for producing sticks of acceptable quality has been significantly high. Moreover, those rejected sticks represent a substantial loss in revenues since they could not be used for their intended purpose, despite some rather costly treatment of the same.

SUMMARY OF THE INVENTION

The system and apparatus encompassed by the present invention overcomes many of the difficulties mentioned above. The present apparatus eliminates to a very large extend the necessity for having sticks which are of as high quality as had been needed in the past. Moreover, the problems associated with locating the region of optimum hardness, and generating the required amount of pressure to successfully inject a stick into the confection material, have also been eliminated. In accordance with a broad form of this invention, there is provided apparatus for inserting a stick into liquid confection material contained in a mold being carried along through a refrigerated zone, comprising support means movably mounted beside that zone; at least one stick-gripping mechanism carried by said support means and being adapted to pick up said stick from a supply of the same, the mechanism including stick-engaging elements biased for releasably gripping the stick; and stick transfer conveyor means including stick-supporting members operable for accepting and releasably supporting the stick received from the stick-gripping mechanism, said conveyor means being adapted to be driven in synchronism with the movement of said mold, and disposed relative to the same to enable the conveyor means to insert said stick into the liquid confection material, support the stick therein while the confection is hardening and automatically effect release of the same after the confection material has solidified sufficiently to support the stick. The support means usually comprises a rotatably mounted transfer spider assembly that is reciprocally movable in a generally vertical direction, in order to enable sticks to be either picked up or transferred and released to said stick transfer conveyor means. Preferably, sticks are provided for pick up by the gripping mechanism in a preselected configuration from a pneumatically-operated supply device. That device comprises two pneumatic pick-up heads carried upon a movably mounted supporting yoke assembly. Each head includes a perforated plate that is slideably supported to enable sticks to be picked up from a supply conveyor according to the configuration selected.

BRIEF DESCRIPTION OF THE DRAWINGS

For a better understanding of the detailed description below, reference should be made to the accompanying drawings which illustrate by means of example only, one preferred embodiment of this invention and in which.

DESCRIPTION OF THE PREFERRED EMBODIMENTS

Figure 1:
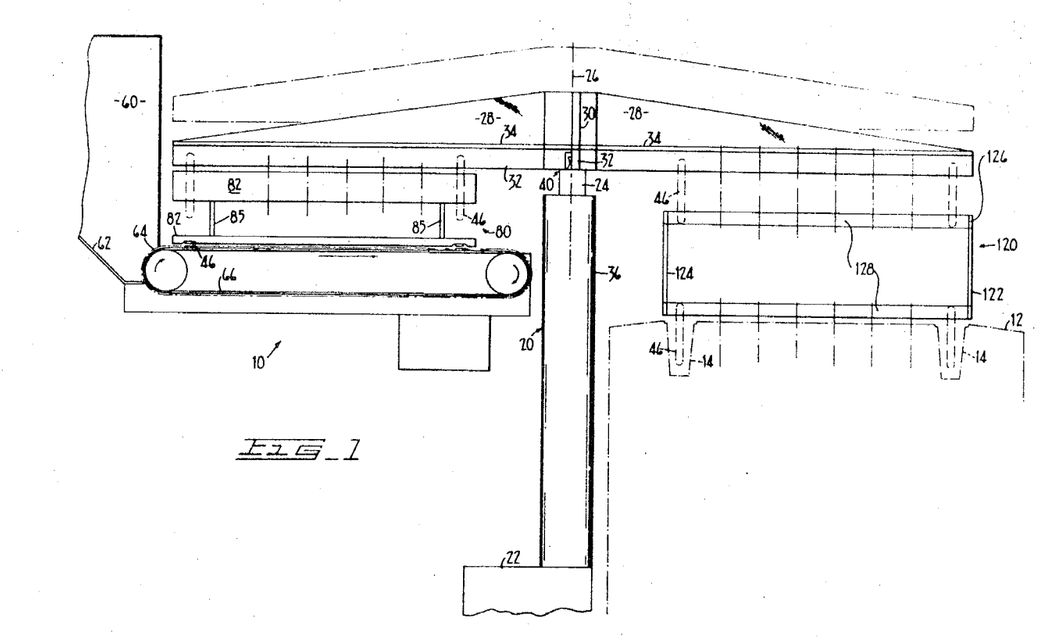
FIGS. 1 and 2 are side and end elevation views showing one system according to this invention as it is located adjacent a conventional ice cream machine.

A stick-inserting system according to the present invention is shown overall at 10 in FIG. 1 as comprising apparatus supported on a floor or base adjacent a conventional ice cream machine shown in ghosted lines at 12. This ice cream machine is conventional in construction and operation and forms no part of the present invention. It will suffice to state simply that the ice cream machine 12 enables a plurality of molds 14 to be supported in and conveyed through a bath of refrigerant, such as brine solution or the like. This bath of refrigerant serves to chill the confection material contained in the molds 14 to a temperature that is less than the freezing point of water, i.e., less than 32°F. or 0°C. The final temperature of frozen and solidified confection being produced as it leaves the bath of refrigerant is commonly in the range from about 0° to 20°F.

In accordance with this invention, the system 10 includes a transfer spider assembly 20, a pick-up device shown overall at 80 and a transfer conveyor 120, all positioned adjacent the ice cream machine 12. The transfer spider assembly 20 includes a base housing 22 that contains the drive means in the form of a motor and gear or belt and pulley arrangements which operate to move the transfer assembly 20, rotationally, and up and down reciprocally. This transfer assembly 20 also includes a central shaft 24 that is adapted to be selectively rotated about a central axis 26. A plurality of laterally extending arms 28 are mounted on the central shaft 24 to be movable simultaneously therewith. Each of these arms 28 is generally T-shaped in cross section, being provided with generally vertically-oriented web sections 30 and 32, and generally horizontally-extending web sections 34. The central shaft 24 is normally enclosed for aesthetic and safety reasons within a housing 36 and is supported by suitable structure within the base 22 to enable the same to be rotatably indexed as desired, as well as being movable to enable the arms 28 to be reciprocated in a generally vertical direction. See U.S. Pat. No. 3,035,686 of May 22, 1962 for a spider assembly having similar motions.

Figure 3:
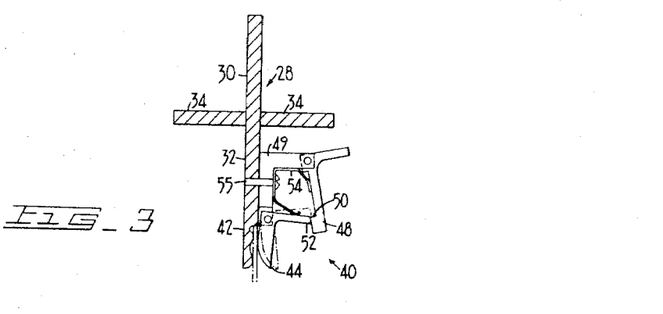
FIG. 3 is an end elevation view showing one type of stick-gripping mechanism that can be used in the system of FIG. 1, with full lines showing that mechanism is a stick-supporting configuration, while ghosted lines show the same mechanism in a stick-releasing configuration.
Figure 4:
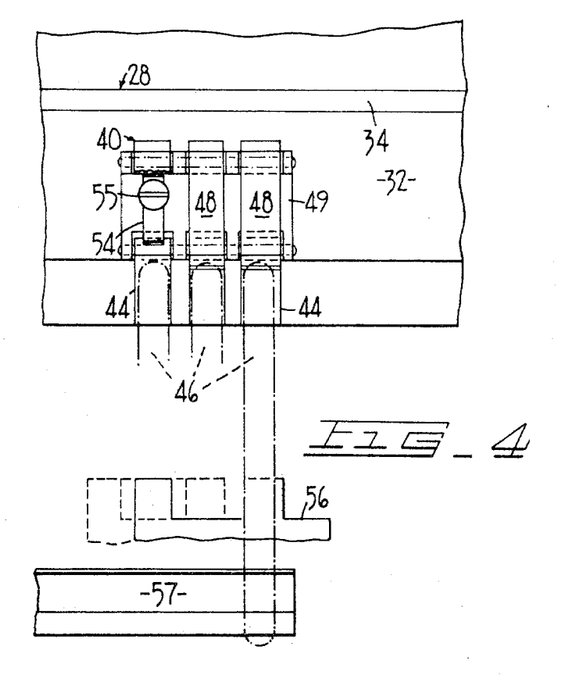
FIG. 4 is a side elevation view showing a cluster of three of the mechanisms of FIGS. 2 and 3.
Figure 6:
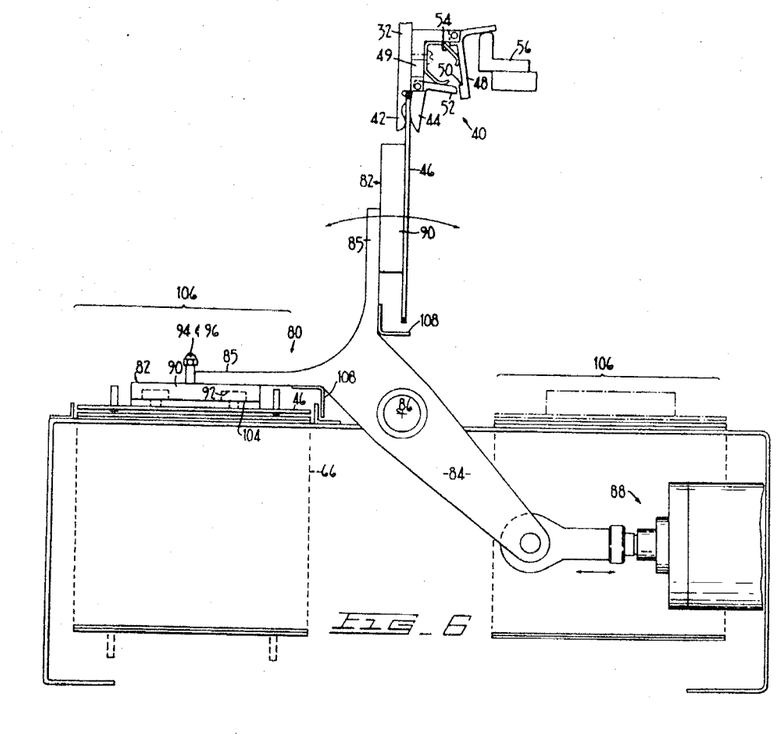
FIG. 6 is an end elevation view taken along line 6—6 of FIG. 5.

A plurality of stick-gripping mechanisms 40 which are best seen in FIGS. 3 and 4 are supported in clusters of three (FIG. 4) from the lower web sections 32 of each of the arms 28. Each of these gripping mechanisms 40 includes a fixed element 42 that is a preformed lower end portion of web section 32, and a movable element 44 that is biased to enable a stick 46 to be releasably supported therebetween. A pivotally mounted locking member 48 is also provided in operative relation to the movable element 44, each being pivotally supported at the free ends of an L-shaped base member 49. The member 48 is pivotal to enable a shoulder 50 thereon to engage a face 52 on the element 44, thereby maintaining that element in an open condition ready to accept further sticks (or release the same). Both the locking element 48 and the pivoting element 44 are biased in a clockwise direction as seen in FIG. 3, by spring means 54. This spring means 54 is secured by fastening screws 55, or the like to the fixed element 42, as is the base member 49. An unlatch bar 56 (see FIG. 6) also is supported by the shaft housing 36 to trip or release the locking element 48. This tripping or unlocking action occurs over the final portion of the downward travel of central shaft 24 and arms 28. Bar 56 has a comb-like profile (FIG. 4) and is adjustable to enable 2, or only 1, stick gripping elements 44 to be activated in each cluster, as desired. Hence, that unlatch bar 56 is laterally slidable relative to the reciprocally movable stick-gripping assembly 40. In addition, a stick release bar 57 is provided, also being supported by the housing 36 and operative to act against the action of spring means 54 to open the gripping elements and allow stick 46 to be released. This release bar 57 is disposed in a horizontal plane to enable release of the gripping elements required for the mechanisms (i.e., configuration) selected (see FIG. 4).

Figure 5:
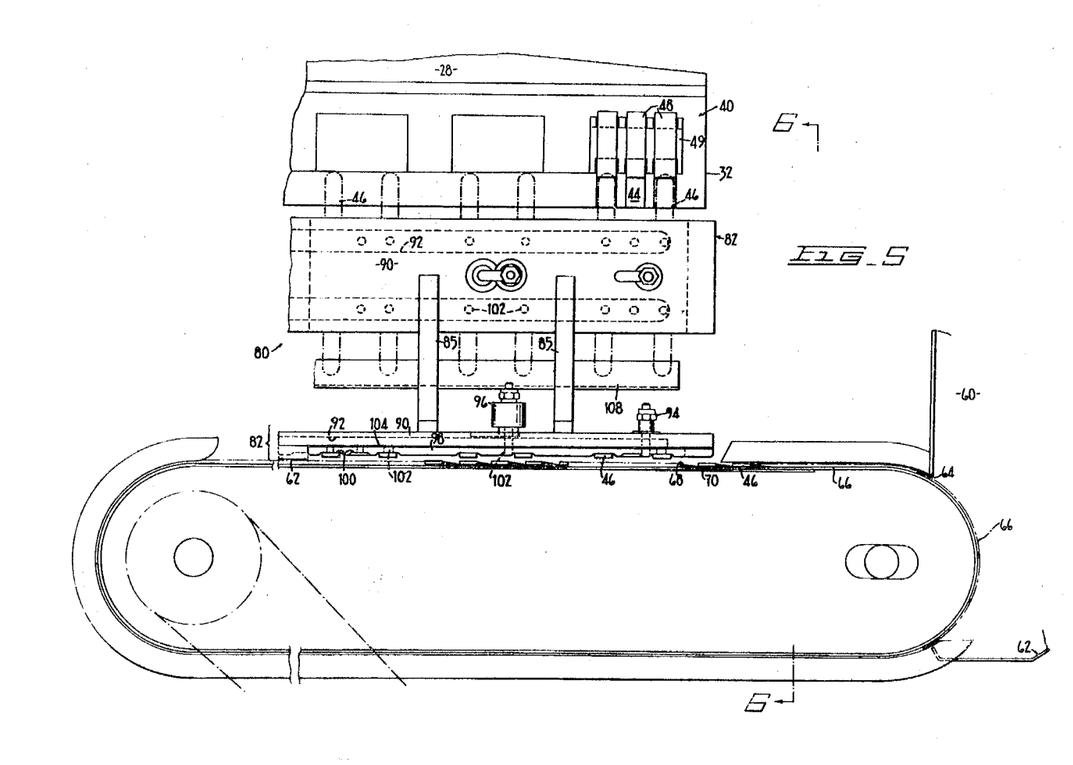
FIG. 5 is a side elevation view showing some of the detail of the pneumatically-operated stick-supplying device and supply conveyor used in the system of FIG. 1.

In the preferred embodiment shown here, a supply of the sticks 46 is provided from a storage hopper 60 which in this instance has a sloping bottom 62 for purposes of directing the sticks 46 to an outlet opening 64. Within the region of this opening 64, the sticks 46 are contacted by a continuous belt conveyor 66 which has a stepped outer surface 68. This can best be seen in FIG. 5. It should be noted that the belt conveyor 66 is driven continuously from a suitable source of power and each of a multitude of recesses 70 defined by the stepped surface 68 will pick up and retain one stick 46. These sticks are then conveyed along into a pick-up zone where they will be picked up in a selected configuration by a vacuum-operated pick-up device 80. This pick-up device 80 can perhaps best be seen in FIGS. 5 and 6, and in this instance, comprises a pair of identical pick-up heads 82. These heads 82 are supported on arm sections 85 from a yoke assembly 84 that is reciprocally pivotable about an axis 86. The reciprocating motion of the yoke 84 is provided by means of a conventional piston and cylinder assembly 88. That piston and cylinder assembly 88 can be operated by means of air, hydraulic fluid or other such material.

Each of the pick-up heads 82 basically comprises a base plate 90 that is fixedly secured as by welding to one of the arms 85 of the yoke 84. Each of these plates 90 is slotted as shown at 92 and in communication with a source of vacuum or low pressure through couplings 94 and 96. A perforated plate 98 is slideably supported by the backing base plate 90, and is provided with a series of transversely extending channels 100 (FIG. 5) which communicate through bore holes 102 to the slots 92 and the source of vacuum. A thin perforated shim 104 is slideably positionable in the interspace between backing base plate 90 and the face plate 98, in order to provide selected access to certain of the channels 100, thereby enabling sticks 46 to be picked up in the configuration selected. It will be apparent that the perforated shim 104 will have perforations therein that are so positioned as to open and enable a vacuum to be drawn in selected ones of the bore holes 102, and hece for the particular channels 100 needed to pick up sticks 46 in the configuration selected, i.e., a single or double stick format.

It is be noted that in respect of the timing of the operations, the belt conveyor 66 travels at a rate which is sufficiently great to ensure that considerably more sticks will ass beneath the pick-up head 82 than can acutally be picked up by the channels 100 therein. Under those circumstances, even if some of the recesses 70 in belt conveyor 66 do not actually pick up any of the sticks 46 this will be of no consequence. Moreover, the first channel 100 that is available for picking up a stick 46 by virtue of having a vacuum drawn therein, will pick up the first stick it encounters. When the stick is picked up and held in channel 100, it blocks off the vacuum and hence subsequent sitcks will move on to be picked up by the next channel which is still open to the source of vacuum. Hence, no channel 100 can pick up more than one stick at a time.

The operation of this apparatus is as follows. The belt conveyor 66 is set into operation to pick up and convey sticks 46 from the supply hopper 60 through both of the pick up zones shown at 106 in FIG. 6. Assume for the moment that with reference to FIG. 6, the right-hand pick-up head 82 had been positioned generally horizontally over the belt conveyor 66 which is supplying the sticks 46. The actuation of the piston and cylinder arrangement 88 is such as to position the pick-up heads 80 in their respective pick-up zones 106 for a period of time that may be anywhere from about one-half a second to 2 or 3 seconds. Such a time period will be of sufficient duration to enable at least two or three times as many recesses 70 in conveyor 66 to pass beneath th pick-up head 82, as there are stick-receiving slots 100 in the latter. Hence, even it not every one of the recesses 70 actually picks up a stick 46 from the supply hopper 60, enough sticks will nevertheless pass beneath the vacuum head 82 to enable the same to pick up its full complement of the same. The yoke assembly 84 is then actuated to swing that pick-up head 82 (i.e., the right-hand one) into the orientation shown in FIG. 6. There, the sticks 46 in the configuration selected will be disposed directly beneath the stick-gripping assemblies 40 that are carried on one of the arms 28 of the transfer spider assembly 20. Next, the supporting and rotating structure for central column 24 of the transfer spider assemby 20 will be activated, so as to lower the same through a distance of travel of some 3-½ to 4-½ inches. In travelling downwardly, the locking element 48 (FIG. 3) which had been holding the movable element 44 open will be enaged by the unlatch bar 56 over the last quarter inch or less of downward travel. In so tripping or releasing the locking element 48, the movable element 44 is pivotally moved, being biased by spring means 54 to engage and grip the sticks 46 that have been seated in the space between finger elemets 42 and 44 of each gripping mechanism 40. In order to ensure that each stick 46 is in fact properly seated, the downward travel of the transfer spider assembly 20 is sufficient to bring each stick into abutting contact with a safety stop 108 that is secured to the junction of the arms 85 in yoke assembly 84. Since the reduced pressure or vacuum is still being applied to the sticks 46, even if the latter have not properly been seated, they would have been at least retained in position against the pick-up head 82 until such time as the seating operation had been completed. Once all of the sticks 46 have properly been seated, the vacuum to the particular pick-up head 82 that is in the stick-loading orientation of FIG. 6 will be stopped or cut for perhaps a second or two. During that time interval the transfer spider assembly 20 will be moved upwardly and hence take with it the sticks 46 which have just been gripped by mechanisms 40.

Figure 2:
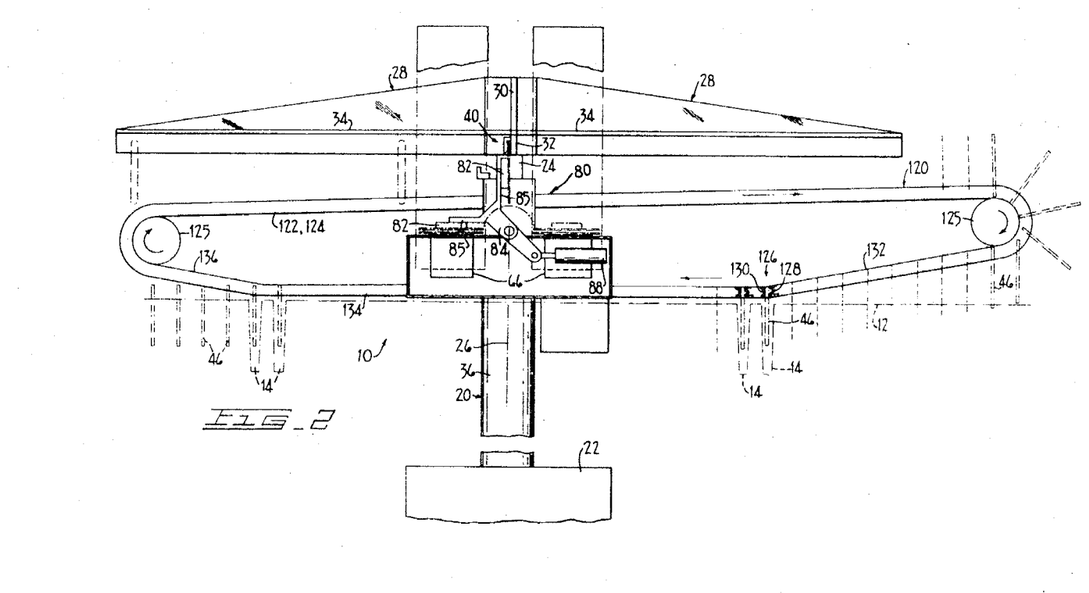

It will be seen from FIG. 1 that stick-transferring conveyor 120 is disposed over the ice cream machine 12 and molds 14 being moved therethrough. This transferring conveyor 120 basically comprises two endless chains or belts 122 and 124 that are spaced laterally apart and are driven by wheel means 125 that are operatively connected to a suitable source of power. The endless chains 122 and 124 serve to support and carry along a plurality of stick-supporting flights 126 of which only two are shown schematically in FIG. 2. Each of these flights 126 basically comprises a preformed sheet metal backing element 128 and cooperating therewith a spring member 130 that is biased to releasably retain the sticks 46 between itself and the backing element 128. Hence it should be recognized that downward travel of the transfer spider assembly 20 to pick up a complement of sticks 46 simultaneously causes sticks already supported on he particular arm 28 disposed over the transferring conveyor 120, to be driven downwardly between the elements 128 and 130 of each of the stick-supporting flights 126. In moving downwardly, the release bar 57 engages the surface 52 (FIG. 3) of the element 94, to open the same against the biasing pressure of spring means 54. In so doing, the sticks 46 are loaded in the desired configuration into the transferring conveyor 120. As seen in FIG. 2, these sticks 46 are then carried along and by means of a sloping portion 132 of the bottom run of the transfer conveyor 120 are inserted into the molds 14 and supported in proper orientation therein along a central part 134 of the bottom run until the confection material has hardened sufficiently to support the sticks. By making the central portions 134 of the conveyor 120 sufficiently long, we have been able to eliminate the necessity of determining just where the confection solution has hardened sufficiently to support the stick therein. Hence, by the time upwardly inclined portion 136 of the bottom run of conveyor 120 is reached, the sticks 46 are firmly gripped by the solidified confection material. Upward movement of the conveyor chain and flights 126 will simply cause the sticks 46 to be automatically released therefrom.

The positioning of the perforated shim 104 in each of the pick-up heads 82 preferably, is operatively coupled to an appropriate driving source whose operation is in timed relation to the feed of either an ice cream emulsion or a popsicle confection mixture to the molds 14 in the ice cream machine 12. The transfer conveyor 120 will readily accept sticks in either configuration, that is, suitable for use either with ice cream bar confections or with popsicles. Accordingly, only the pick-up heads 82 need be activated to enable pick up of sticks 46 in the right confuguration. Specifically, it is the shim 104 which is activated, i.e., moved, in the heads 82 to provide for sticks in the selected configuration compatible with the type of confection being produced.

Various modifications and changes are possible. It is intended, however, to encompass all such changes and modifications within the spirit of this invention as would be apparent to one skilled in this art, by the claims below.

The embodiments of the invention in which an exclusive property or privilege is claimed are defined as follows:

1. Apparatus for inserting sticks into liquid confection material contained in a mold movable through a refrigerated zone, comprising:
   support means mounted in operative relation to that zone, the support means being actuatable for reciprocal movement generally vertically and for rotational indexing movement about an axis at least one stick-gripping mechanism carried by said support means operative to pick up said sticks from a supply of the same, the mechanism including stick-engaging elements biased for releasably gripping the stick therebetween; and stick transfer conveyor means including stick supporting members thereon, said conveyor means being actuatable in synchronism with the movement of said mold, the conveyor means being disposed adjacent the support means and stick-gripping mechanism to receive sticks from the latter and support said sticks while inserting the sticks into the liquid confection material, said conveyor means also supporting said sticks for a predetermined period of time while said material hardens, said conveyor means automatically releasing said sticks which remain supported by the solidified confection material.

2. The apparatus of claim 1, wherein the stick-engaging elements comprise two gripping members of which one is fixed and one is movable, the movable gripping member being biased into contact with the other member for releasably gripping the stick therebetween.

3. The apparatus of claim 2, wherein said stick-gripping mechanism further includes locking means adapted to selectively maintain said members apart, and latch means actuated by movement of said support means for releasing the locking means causing said members to come together.

4. The apparatus of claim 2, wherein said support means comprises a transfer spider assembly having a plurality of arms extending laterally outwardly from a central shaft about whose axis said assembly is rotatable with said rotational indexing motion, each arm carrying a plurality of said stick-gripping mechanisms in clusters arranged to receiving e and releasably retain sticks picked up from said supply in a preselected configuration , in response to said reciprocal movement of the support means.

5. The apparatus of claim 2, wherein a vacuum-operated stick pick-up device is provided in operative relation to a plurality of the stick - gripping mechanisms, the mechanisms being responsive to the reciprocal movement of the support means to receive and grip sticks provided in a preselected configuration by said pick-up device from a supply hopper.

6. The apparatus of claim 2, wherein a vacuum-operated stick pick-up device is provided in operative relation to the support means for supplying sticks in a preselected configuration to a plurality of said stick-gripping mechanisms carried in clusters by the support means, said device including two vacuum operated pick-up heads disposed at generally 90 degrees to one another, said heads being supported by a yoke assembly pivotally mounted in the pick-up device , and each pick-up head being connected to a vacuum source and including a plate slidably mounted on said head and suitably apertured for picking up sticks in said selected configuration.

7. A n apparatus for inserting sticks into a liquid confection material contained in a mold movable through a bath of refrigerant, comprising:

vacuum-operated pick-up device for providing sticks obtained from a supply hopper for presentation in a preselected configuration for insertion into the confection material in said configuration;

a transfer spider assembly positionable in oprative relation to the bath of refrigerant and said supply means, and having a plurality of arms extending radially outwardly from a central shaft , said shaft being verticaly movable reciprocally and rotationally for indexing said arms, each arm supporting a plurality of stick-gripping mechanisms in clusters thereon, each stick-gripping mechanism being adjustable to receive and retain the sticks in said preselected configuration in which they are presented by the pick-up device, each gripping mechanism including two elements of which one element is biased to cause a stick to be gripped releasably therebetween; and a stick transfer conveyor positionable over the bath of refrigerant in operative relation to said spider assembly, said conveyor having a plurality of stick-supporting flights thereon operable for receiving and releasably supporting sticks in said preselected configuration, as presented by the gripping mechanisms on the arms of said transfer spider assembly, said conveyor means being actuatable in synchronism with movement of said mold and disposed to insert the sticks in said preselected configuration into the liquid confection material in said mold, said conveyor means supporting said sticks for a predetermined period of time while the confection material hardens, and automatically releasing the sticks for retention in the now solidified confection material.

8. The apparatus of claim 7, wherein the vacuum-operated pick-up device comprises a pair of pick-up heads disposed at generally 90° to one another, and a yoke assembly mounted for pivotal, reciprocal motion, and supporting said pick-up heads thereon; each pick-up head being connectible to a vacuum source, and including a preformed perforated plate, said plate being slideably mounted on the pick-up head to pick up and support sticks in said preselected configuration by forces generated by the vacuum , said yoke assembly being pivotally movable to cause the vacuum heads to pick up sticks from two separate supply sources, said sources being spaced apart and located in operative relation to an arc traversed b/ said pick-up heads when the yoke assembly is pivotally rotated.

9. The apparatus of claim 8, wherein said supply sources each comprise a continuous belt formed with a series of recesses, each recess being operative to receive one of said sticks from a random supply thereof, said yoke assembly being reciprocally pivotable to position each of the pick-up heads over the belt associated therewith, and cause sticks to be picked up from the belt in said preselected configuration.

* * * * *

UNITED STATES PATENT OFFICE
CERTIFICATE OF CORRECTION

Patent No. 3,744,948                     Dated July 10, 1973

Inventor(s) Italo Caroli

It is certified that error appears in the above-identified patent and that said Letters Patent are hereby corrected as shown below:

In the heading, please add:

--Claims priority, Canada No. 098,316 filed November 17, 1970--.

Signed and sealed this 6th day of August 1974.

(SEAL)
Attest:

McCOY M. GIBSON, JR.
Attesting Officer

C. MARSHALL DANN
Commissioner of Patents